(No Model.)
W. BUNDY.
SAW.
No. 388,821. Patented Sept. 4, 1888.
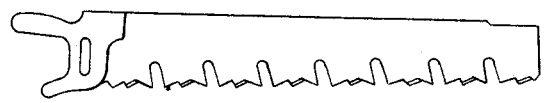
Fig. 1.
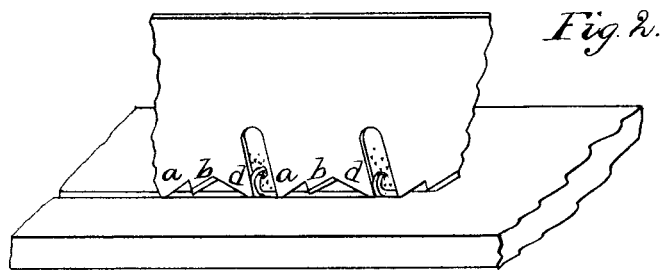
Fig. 2.
   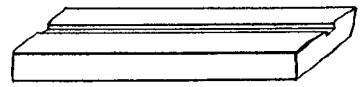
Fig. 3.   Fig. 4.
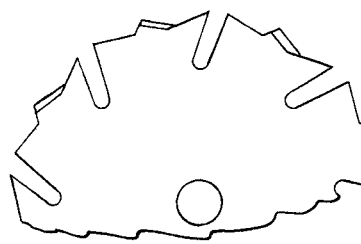
Fig. 5.
Witnesses.
B. Whitaker.
C. Cruikshank.
Inventor:
Warren Bundy
By Jas. A. Cowles,
Atty.

United States Patent Office.

WARREN BUNDY, OF MINNESOTA CITY, MINNESOTA, ASSIGNOR OF TWO-THIRDS TO OTTO TROOST, OF SAME PLACE, AND GILBERT MONTAGUE, OF CHICAGO, ILLINOIS.

SAW.

SPECIFICATION forming part of Letters Patent No. 388,821, dated September 4, 1888.

Application filed January 9, 1888. Serial No. 260,133. (No model.)

*To all whom it may concern:*

Be it known that I, WARREN BUNDY, a citizen of the United States, residing in Minnesota City, in the State of Minnesota, have made certain new and useful Improvements in Saws, of which the following is the specification.

The nature and object of this invention are to provide a saw with draw-cut and clearing teeth.

Figure 1 is a side elevation of a saw with my improvements. Fig. 2 is a detail showing my improvement and the method or process for using the same. The figure is slightly in perspective. Fig. 3 shows the two parallel gashes cut by the chisel-teeth. Fig. 4 shows the wood between the two parallel gashes cut away or cleared out. Fig. 5 is a section of a circular saw with my improvement.

This is an improvement on my applications for patents on saws, Serial Nos. 236,325 and 251,583.

I make a saw with two distinct varieties of teeth. One variety I call the "draw-cut" teeth and the other variety I call the "clearing-" teeth. They are arranged in groups of three teeth each, and each group has two draw-cut teeth and one clearing-tooth, and between each group is a deep recess extending into the blade of the saw. The cutting-teeth are made with their cutting-edges on the outer edge of each tooth and extending the entire length of this edge, and these draw-cut teeth are made in step form—that is, the lower end of the cutting edge starts at the lowest point of the cut between the draw-cut teeth and extends with an incline, and terminates at a point a greater distance from a horizontal line drawn through the point of beginning of the edge of the draw-cut tooth and backward from the forward travel of the saw, and as the saw is moved forward when in use each cutting-tooth presents a draw-cut to the wood. These draw-cut teeth have their cutting-edge on opposite sides of each other—that is, the beveled edges are facing each other—so that when in use each set of two draw-cut teeth cuts two parallel gashes in the wood, as shown in Fig. 3. These draw-cut teeth do not remove the wood between these parallel gashes. This is done by the clearing-teeth, one of which follows each set of draw-cut teeth. This clearing-tooth is made like the body of an ordinary mortising-chisel, with its cutting-edge extending directly across the line of travel of the saw, with a deep recess between it and the draw-cut teeth in front of it, and the office of this clearing-tooth is to clear out or remove the wood between the two parallel gashes made by the two draw-cut teeth immediately in advance, and the office of the deep recess immediately in front of the clearing-tooth is to afford a retreat for the chips or sawdust removed by the clearing-teeth.

In Fig. 2 is shown the practical working of these teeth. The draw-cut teeth *a* and *b* have cut two parallel gashes and the separated part between the gashes is being removed by the clearing-teeth *d*. The draw-cut of the cutting-teeth leaves the sides of the wood comparatively smooth and free from roughness and of a broken fibrous character; hence the saw is worked with less power, and, also, little or no set is required; consequently less wood is cut away in sawing and a corresponding saving of stock is accomplished.

This improvement is adapted to any kind of saws. The clearing-teeth are very slightly shorter than the draw-cut teeth.

I claim—

A saw provided with two cutting-teeth in step form, the longer sides of which are beveled, respectively, to the right and left, forming cutting-edges on the outer edges thereof, and extending from the base of the short side backward and upward from the travel of the saw in a direct line at an angle of about forty-five degrees, and a chisel-tooth with cutting-edges on the front edge thereof and directly transverse the blade of the saw, a little shorter than the cutting-teeth, the end of said tooth inclining back from its transverse edge to the lower end of the incline of the adjoining cutting tooth and in an opposite direction, and a gully in front of chisel-tooth with loop end and square edges.

WARREN BUNDY.

Witnesses:
M. B. WEBBER,
OTTO TROOST, Jr.